US006307069B1

United States Patent
Hashimoto et al.

(12) United States Patent
(10) Patent No.: US 6,307,069 B1
(45) Date of Patent: Oct. 23, 2001

(54) 1,2 - DIOXOLANE DECOMPOSITION REACTIVE EMULSIFIER AND POLYMER-MODIFYING METHOD USING THE SAME

(75) Inventors: Masayuki Hashimoto, Hyogo; Toshiyuki Nishitani, Shiga, both of (JP)

(73) Assignee: Dai-Ichi Kogyo Seiyaku Co., Ltd., Kyoto (JP)

( * ) Notice: Subject to any disclaimer, the term of this patent is extended or adjusted under 35 U.S.C. 154(b) by 0 days.

(21) Appl. No.: 09/363,354

(22) Filed: Jul. 29, 1999

(30) Foreign Application Priority Data

Oct. 1, 1998 (JP) .................................. 10-280289
Mar. 10, 1999 (JP) .................................. 11-063184

(51) Int. Cl.$^7$ .................. C07D 319/02; B01F 17/02; B01F 17/32; B01F 17/42
(52) U.S. Cl. .................. 549/430; 558/31; 558/34; 526/911
(58) Field of Search ............... 549/430; 558/34; 558/31; 526/911

(56) References Cited

U.S. PATENT DOCUMENTS 5,324,862   6/1994   Yokota et al. .
5,332,854   7/1994   Yokota et al. .

FOREIGN PATENT DOCUMENTS 0071019    2/1983   (EP) .
837704     6/1960   (GB) .
61205277 * 9/1986   (JP) ........................ C07C/407/12
3-281602   12/1991  (JP) .
09235247 * 9/1997   (JP) ........................ C07C/43/13
WO 9730058 * 8/1997 (WO) ........................ A61K/9/127

* cited by examiner

*Primary Examiner*—David W. Wu
*Assistant Examiner*—Kelechi Egwim
(74) *Attorney, Agent, or Firm*—Jordan and Hamburg LLP

(57) ABSTRACT

The decomposition reactive emulsifier of this invention is a compound of formula (I):

$$\begin{array}{c} R^1 \\ R^2 \end{array}\!\!>\!\!C\!\!<\!\!\begin{array}{c} O-CH_2 \\ O-CH-CH_2-O-CH_2CHCH_2OCH_2\underset{|}{C}\!\!=\!\!CH_2 \\ \phantom{O-CH-CH_2-O-CH_2CHCH_2OCH_2}O-(AO)_{\overline{n}}-X \end{array} \quad (I)$$

wherein $R^1$ and $R^2$ are the same or different and each represents an alkyl or alkenyl group of from 1 to 20 carbon atoms or a hydrogen atom and both $R^1$ and $R^2$ are not concurrently a hydrogen; $R^3$ is a hydrogen atom or a methyl group; A is an alkylene or substituted alkylene group of 2 to 4 carbon atoms; n is an integer of from 1 to 100 when X is a hydrogen atom or n is an integer of from 0 to 100 when X is an ionic hydrophilic group, said ionic hydrophilic group being anionic, cationic or amphoteric and when n is 2 or greater $(AO)_n$ is a homopolymer or a block copolymer or a random copolymer.

4 Claims, No Drawings

1,2 - DIOXOLANE DECOMPOSITION REACTIVE EMULSIFIER AND POLYMER-MODIFYING METHOD USING THE SAME

TECHNICAL FIELD

This invention relates to a novel decomposition type reactive emulsifier comprising a compound having both a 1,3-dioxolane ring which is easily cleavable under acidic conditions and a copolymerizable unsaturated group and further to a polymer-modifying method comprising using said novel decomposition type-reactive emulsifier.

PRIOR ART

Heretofore known as emulsifiers for emulsion polymerization are anionic surfactants such as dodecylbenzenesulfonates, alkyl sulfates, alkyl sulfosuccinate salts, polyoxyalkylene alkyl(aryl) ether sulfates, etc., nonionic surfactants such as polyoxyalkylene alkyl(aryl) ethers, polyoxy-ethylene-polyoxypropylene block copolymer, etc., and soaps such as higher fatty acid soaps, rosin soap, etc., which are used either independently or in combination. However, the stability of the resulting polymer emulsions and the properties of the films and polymers obtainable from such emulsions are not always fully satisfactory but have much to be desired. Thus, the stability of emulsion polymerization, the suppression of foaming in the course of production, and the mechanical stability, chemical stability, freeze-thaw stability, pigment dispersibility and shelf-life of the resulting emulsion are not satisfactory and, in addition, when the emulsion is used for coating applications, the free emulsifier remains in the coating film so that the final coat is poor in water resistance, adhesion, heat resistance and weather resistance.

Furthermore, in the recovery of the polymer by destruction of the emulsion by salting-out, acid precipitation or other means, the residual emulsifier in the polymer causes deterioration of the physical properties, e.g. water resistance, heat resistance, weather resistance and strength, of the polymer. Therefore, a large quantity of washing water is required for thorough removal of the emulsifier from the polymer but since the emulsifier in the washings contaminates the river and other waters, a laborious procedure is required for removal of the emulsifier and treatment of the effluent.

To overcome the above problems, attempts have been made to reduce the amount of the emulsifier to be used for emulsion polymerization and/or reducing the level of addition of surfactants in other processing stages but none of such attempts has proved dramatically effective in solving the above-mentioned problems. The problems in respect of said stability of emulsion polymerization, stability of the emulsion obtained, and physical properties of the coating film and polymer, thus, remain yet to be solved.

In view of the above circumstances, a large number of reactive emulsifiers containing copolymerizable unsaturated groups have been proposed for overcoming the above-mentioned disadvantages of the conventional emulsifiers. For example, anionic reactive surfactants are described in JP-B-46012472, JP-A-54014431, JP-B-46034894, JP-B-54029657, JP-A-51030285, JP-B-49046291 and JP-A-56127697, among others, and nonionic reactive surfactants are described in JP-A-56028208 and JP-A-50098484, for instance, and using those surfactants, the polymerization of various monomers has been attempted.

However, when such a reactive emulsifier is used independently, the stability of emulsion polymerization is insufficient and the polymerization reaction dose not proceed smoothly in many cases unless it is used in combination with the conventional emulsifier. Moreover, the coating film obtainable from such an emulsion is not fully satisfactory in water resistance, adhesion, heat resistance and weather resistance.

Furthermore, reactive emulsifiers are used for reducing the effluent load in the recovery of the polymer by destroying the emulsion, but the conventional reactive emulsifiers are not satisfactory enough because, in the recovery of the polymer by salting-out or acid precipitation, the polymer cannot be completely precipitated in many cases, with the result that the polymer cannot be easily isolated and the polymer recovery rate is low. Moreover, since the conventional reactive emulsifier is not always well copolymerizable with monomers, the unreacted emulsifier finds its way into the waste water, resulting in a failure to achieve the objective reduction in effluent load.

As a measure for overcoming the above disadvantages, a technology according to a new principle, different from that underlying the reactive emulsifier, has been proposed. According to this technology, a decomposition type surfactant which can be easily decomposed by chemical treatment is used as an emulsifier for emulsion polymerization. For example, JP-A-03281602 discloses a method which comprises using a decomposition type surfactant which can be easily decomposed with an acid as an emulsifier for emulsion polymerization and recovering the polymer by acid precipitation which is procedurally easy. However, depending on the type of hydrophobic group and/or hydrophilic group contained in the emulsifier molecule, the decomposition product obtained by acid treatment is insoluble in water or adsorbed on the polymer so that a large quantity of water is required for washing the polymer. Moreover, the free decomposition product remaining in the polymer after washing adversely affects the physical properties of the polymer. Thus, the above-mentioned disadvantages still remain to be fully obviated.

Meanwhile, for the purpose of modifying a variety of polymers, various surfactants have heretofore been used to impart hydrophilicity, antistatic property, resistance to opacification, wettability, film-forming property and/or compatibility to the substrate polymers. The conventional surfactants, when they remain in the free form, cause aging , i.e. time-dependent degradation, of polymer properties and are not satisfactory, either, in the aspect of performance. Recently, to overcome those disadvantages, attempts have been made to use reactive emulsifiers as polymer-modifying agents but since the copolymerizability of the known emulsifiers with various monomers is not necessarily high, the problem of aging in polymer properties has not been sufficiently solved. Moreover, deterioration of the physical properties of polymers is a further disadvantage. Moreover, the reactive emulsifier essentially comprises both a hydrophobic moiety and a hydrophilic moiety but when the objective of its use is to impart hydrophilicity, for instance, the hydrophobic moiety is not always essential but rather detracts from the physical properties of polymers in many instances. Thus, the above-mentioned disadvantages have not been fully obviated.

OBJECT OF THE INVENTION

This invention, developed in the above state of the art, has for its object to provide a decomposition type-reactive emulsifier for emulsion polymerization which insures a high degree of stability of emulsion polymerization, marked improvements in the water resistance, adhesion, heat resistance and weather resistance of the coating film obtainable from the resulting emulsion, the ease with which the polymer emulsion can be destroyed, and marked improvements in the physical properties of the product polymer.

SUMMARY OF THE INVENTION

This invention has been developed with attention paid to he above disadvantages of the prior art.

DETAILED DESCRIPTION OF THE INVENTION (1) History of the Invention

The inventors of this invention did much research and found that a compound having both a 1,3-dioxolane ring which is ready to undergo decomposition under acidic conditions and an allyl or methallyl group as a copolymerizable unsaturated group is suited as an emulsifier for emulsion polymerization.

(2) Summary of the Invention

Based of the above finding, this invention is essentially directed to a decomposition type reactive emulsifier of the following general formula (I) (hereinafter referred to as "the decomposition type reactive emulsifier of the invention" or briefly as "the emulsifier of the invention").

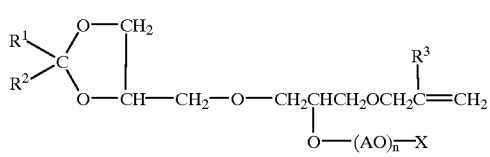
(I)

wherein $R^1$ and $R^2$ may be the same or different and each represents an alkyl or alkenyl group of 1~20 carbon atoms or a hydrogen atom (provided, however, that both of $R^1$ and $R^2$ are not concurrently hydrogen); $R^3$ represents a hydrogen atom or a methyl group; X represents a hydrogen atom or an ionic hydrophilic group; A represents an unsubstituted or substituted alkylene group of 2~4 carbon atoms; n represents an integer of 0~100, inclusive, and when n is equal to 2 or more, $(AO)_n$ may be a homopolymer consisting of one kind of repeating unit represented by the following formula (i) or a block or random polymer consisting of two or more kinds of repeating units having dissimilar substituent groups A $(A^1, A^2, \ldots)$ as represented by the following formula (ii).

$$-(AO)-(AO)-(AO)- \quad (i)$$

$$-(A^1O)_{n1}-(A^2O)_{n2}- \quad (ii)$$

(where $n_1+n_2+ \ldots =n$)

(3) Substituent Groups

Referring to the compound of the above general formula (I), the substituents $R^1$ and $R^2$ may be the same or different and each represents an alkyl or alkenyl group of 1~20 carbon atoms or a hydrogen atom. Thus, for example, methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl can be mentioned.

The alkenyl group includes propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl and eicosenyl, to mention some preferred examples.

The above species of alkyl and alkenyl groups may occur mixedly in the compound of general formula (I).

When $R^1$ and/or $R^2$ is a hydrocarbon group of more than 20 carbon atoms, the recovery of the polymer by acid precipitation presents the problem that the decomposition product will be sparingly soluble or insoluble in water, warm water or alcohol and/or tends to be adsorbed on the polymer.

$R^3$ represents a hydrogen atom or a methyl group.

The symbol A represents an unsubstituted or substituted alkylene group of 2~4 carbon atoms and includes ethylene, propylene, butylene and isobutylene.

The symbol n represents an integer of 0 through 100, inclusive. When n is equal to 2 or more, $(AO)_n$ in general formula (I) may be a homopolymer consisting of one kind of repeating unit [formula (i) given above] or a block or random polymer consisting of 2 or more kinds of repeating units having dissimilar substituents $A (A^1, A^2, \ldots)$ [formula (ii) given above]. Furthermore, when n is equal to 2 or more, $(AO)_n$ may be a mixture of said homopolymer and/or block polymer and/or random polymer.

The symbol X in general formula (I) may be a hydrogen atom [the following general formula (II)]

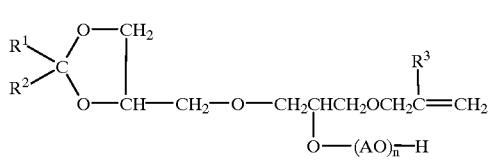
(II)

X in general formula (I) may be $-(CH_2)_p-SO_3M^1$ (where p represents an integer of 2~4; $M^1$ represents a hydrogen atom, an alkali metal, an alkaline earth metal, ammonium or an alkanolamine residue) [the following general formula (III)].

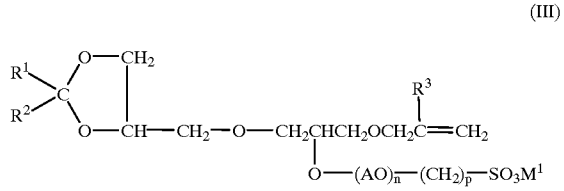
(III)

X in general formula (I) may be $-SO_3M^2$ (wherein $M^2$ represents a hydrogen atom, an alkali metal, an alkaline earth metal, ammonium or an alkanolamine residue) [the following general formula (IV)].

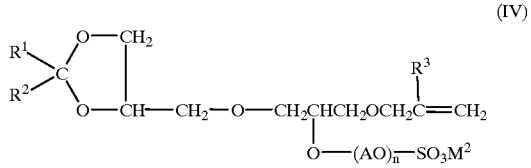
(IV)

X in general formula (I) may be $-CO-CH_2-CH(So_3M^3)COOM^4$ or $-CO-CH(SO_3M^3)-CH_2COOM^4$ (wherein $M^3$ and $M^4$ each represents a hydrogen atom, an alkali metal, an alkaline earth metal, ammonium or an alkanolamine residue and $M^3$ and $M^4$ may be the same or different [the following general formula (V)].

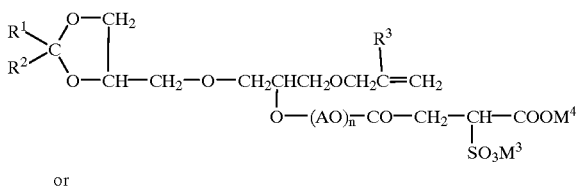

(V)

or

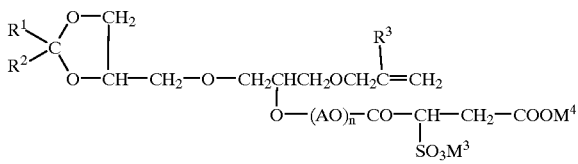

(V)

or a mixture thereof.

Furthermore, X in general formula (I) may be —($CH_2$)q-COO$M^5$ (wherein q is equal to 1 or 2 and $M^5$ represents a hydrogen atom, an alkali metal, an alkaline earth metal, ammonium or an alkanolamine residue) [the following general formula (VI)].

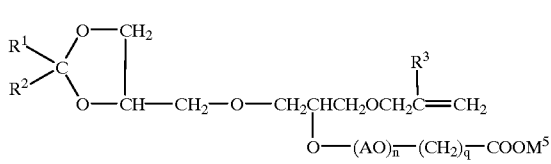

(VI)

(4) Synthesis

The reaction for production of the decomposition type reactive emulsifier is not particularly restricted. Firstly, the starting material 1,3-dioxolane compound having long-chain alkyl groups [the following general formula (VII)] can be obtained by causing a long-chain aldehyde or ketone to undergo dehydrative condensation with glycerol in the presence of an acid catalyst. It can also be prepared by acetylating a cyclic acetal such as an α,β-alkylideneglycerol, e.g. 1,2-isopropylideneglycerol, subjecting the acetylation product to acetal exchange reaction with a long-chain aldehyde or ketone in the presence of an acid catalyst and hydrolizing the resulting compound.

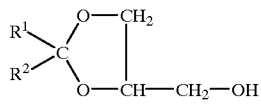

(VII)

Further, the objective decomposition type reactive emulsifier (II) of the invention can be obtained by reacting said 1,3-dioxolane compound [the above general formula (VII)] with allyl glycidyl ether or methallyl glycidyl ether in the presence of a catalyst and alkoxylating the reaction product in the conventional manner.

Furthermore, the decomposition type reactive emulsifiers (III)~(VI) of the invention can be obtained by introducing an ionic group in the following manner.

Thus, the compound of general formula (III) can be obtained by the per se known sulfonation reaction using a sulfonating agent such as 1,4-butanesultone, 1,3-propanesultone, sodium isethioic acid or the like, optionally followed by neutralization with a known neutralizing agent, to provide the objective decomposition type reactive emulsifier of the invention.

The compound of general formula (IV) can be obtained by the per se known sulfation reaction using a sulfating agent such as sulfamic acid-pyridine, sulfane-pyridine or the like, optionally followed by neutralization with a known neutralizing agent, to provide the objective decomposition type reactive emulsifier of the invention.

The compound of general formula (V) can be obtained by reaction with maleic anhydride in the presence of a catalyst to obtain a monoester compound and subsequent sulfonation using a sulfonating agent such as sodium sulfite, sodium hydrogensulfite or the like in the per se known manner, optionally followed by neutralization with a known neutralizing agent, to provide the objective decomposition type reactive emulsifier of the invention.

The compound of general formula (VI) can be obtained by the per se known carboxylation reaction using a monohaloacetic acid, e.g. monochloroacetic acid, monobromoacetic acid, monochloropropionyl acetic acid or the like, or a salt thereof in the presence of a catalyst in the per se known manner, optionally followed by neutralization with a known neutralizing agent, to provide the objective decomposition type reactive emulsifier of the invention. The objective decomposition type reactive emulsifier can also be obtained by reaction with acrylonitrile or an acrylic acid ester and subsequent saponification with alkali, optionally followed by neutralization with a known neutralizer, to provide the objective decomposition type reactive emulsifier of the invention.

(5) Monomers for Emulsion Polymerization

The monomer which can be used in the emulsion polymerization using the decomposition type reactive emulsifier of this invention includes but is not limited to acrylic monomers such as acrylic acid, methyl acrylate, ethyl acrylate, butyl acrylate, 2-ethylhexyl acrylate, methyl methacrylate, acrylonitrile, acrylamide, acrylic hydroxy esters, etc.; aromatic monomers such as styrene, divinylbenzene, etc.; vinyl ester monomers such as vinyl acetate etc.; halogenated olefin monomers such as vinyl chloride, vinylidene chloride, etc.; conjugated diolefin monomers such as butadiene, isoprene, chloroprene, etc.; ethylene, maleic anhydride, methyl maleate, and so on.

The decomposition type reactive emulsifier of this invention can be used for the emulsion or suspension polymerization of one or more kinds of monomers mentioned above.

(6) Polymerization Conditions

In the emulsion polymerization reaction using the decomposition type reactive emulsifier of this invention, a variety of known initiators can be used as the polymerization initiator. However, since the decomposition type reactive emulsifier of this invention decomposes under acidic conditions, the emulsion polymerization system should be maintained at pH not less than 4 throughout the reaction time. Therefore, when an ordinary initiator for emulsion polymerization, e.g. a persulfate such as ammonium persulfate or potassium persulfate, is used as the polymerization initiator, the polymerization system must be maintained at a suitable pH level by using a pH control agent. In this sense, the preferred polymerization initiator for the emulsion polymerization using the decomposition type reactive emulsifier of this invention is a redox initiator which shows little pH change during polymerization and is amenable to pH control. The redox initiator includes but is not limited to cumene hydroperoxide, diisopropylbenzene hydroperoxide, p-menthane hydroperoxide and hydrogen peroxide.

The pH control agent which can be used includes but is not limited to sodium hydrogencarbonate, disodium hydrogenphosphate, sodium carbonate, sodium hydroxide and potassium hydroxide.

The polymerization promoter which can be used includes but is not limited to sodium pyrosulfite, sodium hydrogensulfite, ferrous sulfate, glucose, sodium formaldehydesulfoxylate, and ascorbic acid and its sodium salt.

The amount of the decomposition type reactive emulsifier of this invention to be used in an emulsion polymerization system is not particularly restricted but is generally 0.1~20 parts by weight based on 100 parts by weight of the total monomer. The preferred range is 0.2~8.0 parts by weight. When the decomposition type reactive emulsifier of this invention is used for the purpose of modifying a polymer, its amount can be judiciously selected, without being restricted to the above-mentioned range, with reference to the kind of monomer, objective modification form and desired characteristics.

Where necessary, other kinds of emulsifiers or protective colloids, chain transfer agents, electrolytes, etc. can be used concomitantly.

The mode of addition of the monomer and polymerization initiator to a polymerization system is not particularly restricted but a suitable procedure can be selected from among those used conventionally for emulsion polymerization, i.e. en bloc addition, continual addition and divided addition.

Action

The decomposition type reactive emulsifier of this invention is a novel emulsifier for emulsion polymerization characterized in that it contains both a 1,3-dioxane ring which is ready to decompose under acidic conditions and a copolymerizable unsaturated group.

The decomposition type reactive emulsifier of this invention insures a smooth and steady emulsion polymerization reaction as its intrinsic characteristic and, at the same time, the copolymerizable unsaturated group contained in its molecule reacts with the monomer and is hence built into the polymer, with the consequent marked improvements in the foaming property, mechanical stability and shelf-life of the polymer emulsion.

Furthermore, in the coating film constructed from the polymer emulsion thus obtained, the amount of the free emulsifier contained is considerably small so that the physical properties, e.g. water resistance, adhesion, heat resistance and weather resistance, of the cured film are very satisfactory.

Moreover, after emulsion polymerization, the 1,3-dioxolane ring of the decomposition type reactive emulsifier molecule can be decomposed by lowering the pH of the system with an organic or inorganic acid, whereby the emulsifier can be inactivated and the polymer be easily separated and recovered.

The polymer emulsion obtained by using the decomposition type reactive emulsifier of this invention is very useful in that the emulsion can be easily destroyed at any time and that the total organic contents of the effluent from the polymer recovery-washing stage can be decreased.

Furthermore, in the use of the decomposition type reactive emulsifier of this invention for modification of a polymer, it contributes to improved monomer compatibility as an emulsifier effect and after completion of emulsion polymerization, as the 1,3-dioxolane ring of the emulsifier molecule is decomposed with an acid, only its hydrophilic moiety is selectively made available to the polymer, thus imparting hydrophilicity, antistatic property, resistance to opacification, and wettability to the polymer as well as the compatibility necessary for polymer alloying. In addition, those effects are long-sustained.

Moreover, as the 1,3-dioxolane ring of the decomposition type reactive emulsifier molecule built into the polymer is decomposed by the acid added, a diol derived from the glycerol forms in the site of cleavage and this can be exploited in the modification and crosslinking of the polymer.

In accordance with this invention, there can be provided a novel decomposition type reactive emulsifier for emulsion polymerization which improves both the stability of emulsion polymerization and the stability of the resulting polymer emulsion, overcomes the foaming trouble during production, improves the polymer recovery rate in the polymer recovery stage, thus contributing a great deal to improved productivity, and further insures a marked reduction in the amount of organic substances in the effluent from the polymer recovery and washing stage.

Furthermore, in accordance with this invention, there can be provided a novel decomposition type reactive emulsifier for emulsion polymerization which is capable of improving the water resistance and heat resistance of the polymer and polymer film obtainable from the polymer emulsion.

In addition, this invention provides a polymer-modifying technology which comprises using the novel decomposition type reactive emulsifier of this invention to improve the physical properties of the product polymer and polymer film.

Because of the foregoing effects, this invention is expected to contribute to the development of the related industry and benefit the users of its products.

EXAMPLES

The following examples and comparative examples are intended to describe the working mode and effect of this invention only for illustrative purposes and should by no means be construed as defining the scope of the invention. In the following description, % and parts are by weight.

Production Example 1

A reactor equipped with a stirrer, reflux-condenser, thermometer and nitrogen gas inlet pipe was charged with 297 g of 2-tridecanone, 166 g of glycerol and a solvent amount of toluene, and following addition of p-toluenesulfonic acid as a catalyst, the dehydrative condensation reaction was carried out at the reflux temperature for 24 hours. The resulting crude product was washed with an aqueous solution of potassium carbonate and further with 3 portions of distilled water and finally purified by distillation under reduced pressure to provide 2-methyl-2-undecyl-4-hydroxymethyl-1,3-dioxolane.

Then, the same reactor as above was charged with 326 g of 2-methyl-2-undecyl-4-hydroxymethyl-1,3-dioxolane and, after addition of the catalyst boron trifluoride etherate, 137 g of allyl glycidyl ether was added dropwise at a temperature not exceeding 50° C. The mixture was then incubated for aging at 50° C. for 6 hours.

The reaction product, 386 g, was transferred to an autoclave and using boron trifluoride etherate as a catalyst, 1320 g (30 moles) of ethylene oxide was added at 1.5 kg/cm$^2$ and 50° C. The resulting ethylene oxide (30 moles) adduct was designated as the decomposition type reactive emulsifier [A] (the "ethylene oxide" will hereinafter be referred to sometimes as EO).

In the same manner, an ethylene oxide (80 moles) adduct was prepared by using 3520 g (80 moles) of ethylene oxide and this adduct was designated as the decomposition type reactive emulsifier [B].

Reactive emulsifier (A)

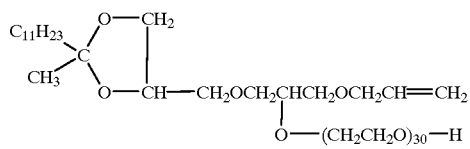

Reactive emulsifier (B)

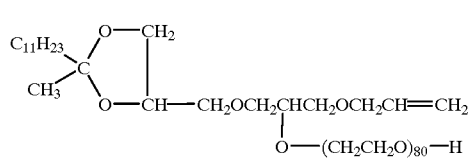

Production Example 2

A reactor equipped with a stirrer, reflux-condenser, thermometer and nitrogen gas inlet pipe was charged with 297 g of 7-tridecanone, 166 g of glycerol and a solvent amount of toluene, and after addition of p-toluenesulfonic acid as a catalyst, the dehydrative condensation reaction was carried out at the reflux temperature for 24 hours. The resulting crude product was washed with an aqueous solution of potassium carbonate and further with 3 portions of distilled water and finally purified by distillation under reduced pressure to provide 2,2-dihexyl-4-hydroxymethyl-1,3-dioxolane.

Then, the same reactor as above was charged with 326 g of 2,2-dihexyl-4-hydroxymethyl-1,3-dioxolane and, after addition of the catalyst triethylamine, 137 g of allyl glycidyl ether was added dropwise at a temperature not exceeding 110° C. The temperature was then increased to 120° C. and the reaction mixture was incubated for aging at 120° C. for 4 hours.

The reaction product, 386 g, was transferred to an autoclave and using sodium oxide as a catalyst, 880 g (20 moles) of ethylene oxide was added at 1.5 kg/cm$^2$ and 130° C. The resulting ethylene oxide (20 moles) adduct was designated as the decomposition type reactive emulsifier [C].

In the same manner, an ethylene oxide (50 moles) adduct was prepared by using 2200 g (50 moles) of ethylene oxide and this adduct was designated as the decomposition type reactive emulsifier [D].

Reactive emulsifier (C)

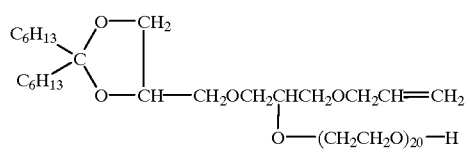

Reactive emulsifier (D)

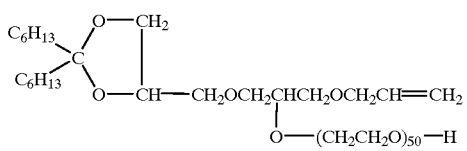

Production Example 3

A reactor equipped with a stirrer, reflux-condenser, thermometer and nitrogen gas inlet pipe was charged with 198 g of 1,2-isopropylideneglycerol and 230 g of acetic anhydride, and using pyridine as a catalyst, the acetylation reaction was carried out at the reflux temperature for 1 hour. This reaction mixture was subjected to distillation under reduced pressure to provide acetyl-1,2-isopropylideneglycerol.

Then, the same reactor as above was charged with 226 g of acetyl-1,2-isopropylideneglycerol, 221 g of n-dodecanal and a solvent amount of toluene. Thereafter, p-toluenesulfonic acid was added as a catalyst and the acetal exchange reaction was carried out under reflux conditions. Then, a solution of sodium hydroxide in ethanol was added to decompose the ester moiety at the reflux temperature and the ethanol was distilled off under reduced pressure. The resulting crude product was extracted into diethyl ether and washed with 3 portions of distilled water. The diethyl ether layer was dehydrated over potassium carbonate and the diethyl ether was distilled off under reduced pressure. The residue was further purified by distillation under reduced pressure to provide 2-undecyl-4-hydroxymethyl-1,3-dioxolane.

Then, the same reactor as above was charged with 284 g of 2-undecyl-4-hydroxymethyl-1,3-dioxolane, and after addition of the catalyst potassium hydroxide, 125 g of allyl glycidyl ether was added dropwise at a, temperature not exceeding 80° C. The temperature was then increased to 100° C. and the reaction mixture was incubated for aging at 100° C. for 4 hours.

The reaction product, 372 g, was transferred to an autoclave and in the presence of the potassium hydroxide catalyst, the addition reaction was carried out by adding 216 g (3 moles) of butylene oxide at 1.5 kg/cm$^2$ and 140° C. and, then, 3960 g (90 moles) of ethylene oxide at 1.5 kg/cm$^2$ and 130° C. to provide the butylene oxide (3 moles) /ethylene oxide (90 moles) adduct as the decomposition type reactive emulsifier (E) (the "butylene oxide" will hereinafter be referred to sometimes as BO).

Reactive emulsifier (E)

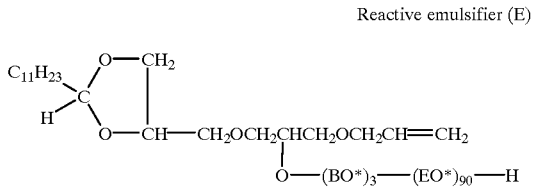

Production Example 4

The decomposition type reactive emulsifier [F] of this invention was obtained by synthesizing 2-heptyl-4-hydroxymethyl-1,3-dioxolane from n-octanal and glycerol, reacting this product with 1 mole of methallyl glycidyl ether and finally adding 5 moles of ethylene oxide in otherwise the same manner as in Production Example 1.

Reactive emulsifier [F]

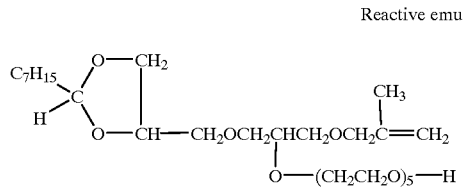

Production Example 5

The decomposition type reactive emulsifier [G] of this invention was obtained by synthesizing 2-pentyl-4-hydroxymethyl-1,3-dioxolane from n-hexanal and glycerol, reacting this product with 1 mole of allyl glycidyl ether, and adding 2 moles of ethylene oxide, 4 moles of butylene oxide, and 80 moles of ethylene oxide serially in otherwise the same manner as in Production Example 1.

Reactive emulsifier [G]

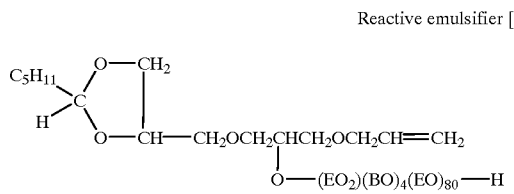

Production Example 6

The decomposition type reactive emulsifier [H] of this invention was obtained by synthesizing 2-heptadecyl-4-hydroxymethyl-1,3-dioxolane from n-octadecanal and glycerol, reacting this product with 1 mole of allyl glycidyl ether, and adding 50 moles of ethylene oxide and 5 moles of propylene oxide to carry out a random addition reaction in otherwise the same manner as in Production Example 1. [the "propylene oxide" will hereinafter referred to sometimes as PO].

Reactive emulsifier [H]

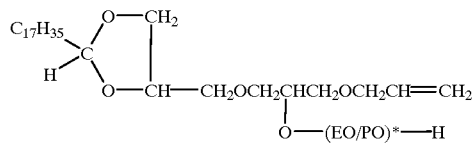

* EO: ethylene oxide, PO: propylene oxide
(EO/PO = 50M/5M random adduct)

Production Example 7

A reactor was charged with 826 g of 2-methyl-2-undecyl-4-hydroxymethyl-1,3-dioxolane-allyl glycidyl ether (1 mole)-ethylene oxide (10 moles) adduct prepared in the same manner as in Production Example 1. After addition of toluene as a solvent and 40 g of sodium hydroxide, the mixture was heated to 60° C. and 136 g of 1,4-butanesultone was added dropwise at a temperature not exceeding 70° C. The temperature was then increased to 75° C. and the reaction mixture was incubated for aging for 6 hours. After completion of aging, isopropyl alcohol was added, and after stirring, the precipitated salt was filtered off. The solvent was then distilled off under reduced pressure and the residue was designated as the decomposition type reactive emulsifier [I] of this invention.

Reactive emulsifier [I]

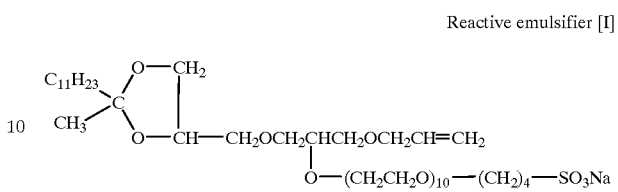

Production Example 8

A reactor was charged with 826 g of 2-methyl-2-undecyl-4-hydroxymethyl-1,3-dioxolane-allyl glycidyl ether (1 mole)-ethylene oxide (10 moles) adduct prepared in the same manner as in Production Example 1 and, as a solvent, N,N-dimethylformamide was added. The mixture was heated at 60° C. and, as a sulfating agent, a stirred mixture of 97 g of sulfamic acid and 116 g of pyridine was added dropwise at a temperature not exceeding 70° C. The temperature was then increased to 80° C. and the reaction mixture was incubated for aging at this temperature for 2 hours. After completion of aging, isopropyl alcohol was added, and after stirring, the precipitated salt was filtered off. The solvent was then distilled off and the residue was designated as the decomposition type reactive emulsifier [J] of this invention.

In the same manner, 2-methyl-2-undecyl-4-hydroxymethyl-1,3-dioxolane-allyl glycidyl ether (1 mole)-ethylene oxide (40 moles) adduct was sulfated and the product was designated as the decomposition type reactive emulsifier [K] of this invention.

Reactive emulsifier [J]

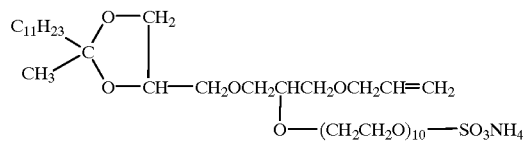

Reactive emulsifier [K]

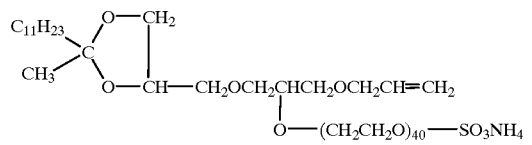

Production Example 9

A reactor was charged with 826 g of 2-methyl-2-undecyl-4-hydroxymethyl-1,3-dioxolane-allyl glycidyl ether (1 mole)-ethylene oxide (10 moles) adduct prepared in the same manner as in Production Example 1 and, as a solvent, N,N-dimethylformamide was added. The mixture was heated at 60° C. and, as a sulfating agent, a stirred mixture of 97 g of sulfamic acid and 116 g of pyridine was added dropwise at a temperature not exceeding 70° C. The temperature was then increased to 80° C. and the reaction mixture was incubated for aging at this temperature for 2 hours. After completion of aging, isopropyl alcohol was added, and after stirring, the precipitated salt was filtered off.

To the filtrate was added a solution of 40 g of sodium hydroxide in methanol, and the byproduct gaseous ammonia and the solvent were removed under reduced pressure. The residue was designated as the decomposition type reactive emulsifier [L] of this invention.

Reactive emulsifier [L]

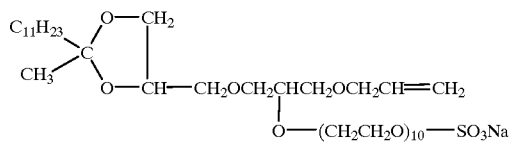

Production Example 10

A reactor was charged with 826 g of 2-methyl-2-undecyl-4-hydroxymethyl-1,3-dioxolane-allyl glycidyl ether (1 mole)-ethylene oxide (10 moles) adduct prepared in the same manner as in Production Example 1 and, as a catalyst, sodium acetate was added. Thereafter, 98 g of maleic anhydride was added. The temperature was then increased to 80° C. and the reaction was allowed to proceed for 4 hours. Then, a solution of 126 g of sodium sulfite in 150 g of water was added. After 150 g of isopropyl alcohol was further added, the reaction was conducted at 80° C for 3 hours. Then, water and the solvent were distilled off under reduced pressure. The residue was designated as the decomposition type reactive emulsifier [M] of this invention.

Reactive emulsifier [M]

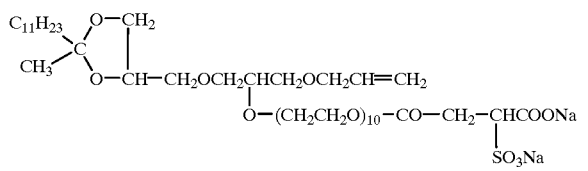

Production Example 11

A reactor was charged with 826 g of 2-methyl-2-undecyl-4-hydroxymethyl-1,3-dioxolane-allyl glycidyl ether (1 mole)-ethylene oxide (10 moles) adduct obtained in the same manner as in Production Example 1. Then, 117 g of sodium monochloroacetate was added and a solution of 40 g of sodium hydroxide in methanol was further added gradually. The reaction mixture was then incubated for aging at 50° C. for 15 hours. After completion of aging, acetone was added, and after stirring, the precipitated salt was filtered off. The solvent was then distilled off under reduced pressure and the residue was designated as the decomposition type reactive emulsifier [N] of this invention.

In the same manner, 2-methyl-2-undecyl-4-hydroxymethyl-1,3-dioxolane-allyl glycidyl ether (1 mole)-ethylene oxide (40 moles) adduct was carboxylated and the reaction product was designated as the decomposition type reactive emulsifier [O] of this invention.

Reactive emulsifier [N]

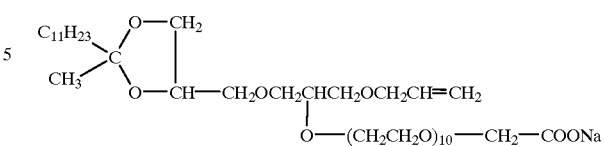

Reactive emulsifier [O]

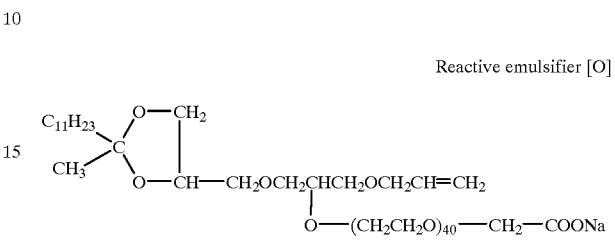

Production Example 12

2,2-Dihexyl-4-hydroxymethyl-1,3-dioxolane-allyl glycidyl ether (1 mole)-ethylene oxide (20 moles) adduct obtained in the same manner as in Production Example 2 was sulfated with sulfamic acid-pyridine as in Production Example 8 and the reaction product was designated as the decomposition type reactive emulsifier [P] of this invention.

Reactive emulsifier [P]

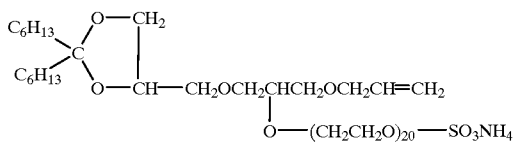

Production Example 13

The 2-heptyl-4-hydroxymethyl-1,3-dioxolane-methallyl glycidyl ether (1 mole)-ethylene oxide (5 moles) adduct obtained in Production Example 4 (the decomposition type reactive emulsifier [F] of this invention) was sulfated with sulfamic acid-pyridine as in Production Example 9 and the reaction product was designated as the decomposition type reactive emulsifier [Q] of this invention.

Reactive emulsifier [Q]

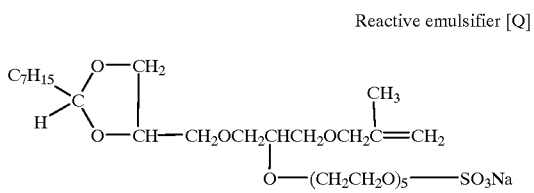

Production Example 14

The procedure of Production Example 1 was followed to synthesize 2-undecyl-4-hydroxymethyl-1,3-dioxolane from n-dodecanal and glycerol, react it with 1 mole of allyl glycidyl ether, and subject the reaction product to addition reaction with 3 moles of butylene oxide and 30 moles of ethylene oxide serially. The resulting adduct was sulfated with sulfamic acid-pyridine as in Production Example 9. This reaction product was designated as the decomposition type reactive emulsifier [R] of this invention.

Reactive emulsifier [R]

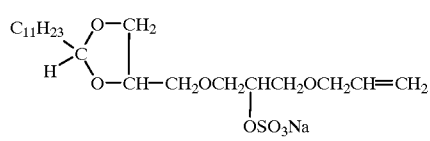
O—(BO)$_3$(EO)$_{30}$—SO$_3$Na

Production Example 15

The procedure of Production Example 1 was followed to synthesize 2-undecyl-4-hydroxymethyl-1,3-dioxolane from n-dodecanal and glycerol and react it with 1 mole of allyl glycidyl ether. This reaction product was sulfated with sulfamic acid-pyridine as in Production Example 9 to provide the decomposition type reactive emulsifier [S] of this invention.

Reactive emulsifier [S]

OSO$_3$Na

Example of Use-1

A reactor equipped with a stirrer, reflux-condenser, thermometer, drip funnel and nitrogen gas inlet tubing was charged with 290 g of deionized water and 0.5 g of sodium hydrogencarbonate, and after the temperature was increased to 80° C., nitrogen gas was bubbled into the water to remove dissolved oxygen. Separately, 10 g of the decomposition type reactive emulsifier shown in Table 1 was dissolved in vinyl acetate (140 g)-butyl acrylate (60 g), and the reactor was charged with a 42 g portion, i.e. 20%, the above solution as well as 0.5 g of ammonium persulfate for preliminary polymerization. Then, over a period from 10 minutes to 3 hours after initiation of the polymerization reaction, 168 g of the remaining monomer-emulsifier mixture was further added dropwise for polymerization. The reaction mixture was then incubated for aging at the polymerization temperature for 2 hours. After cooling, the emulsion obtained was taken out for use as a test sample.

The amount of coagulated matter in this emulsion polymerization stage, the solids content, mechanical stability and foaming property of the emulsion obtained, the reaction rate of the emulsifier used, and the water resistance of the polymer film obtained from the emulsion were respectively determined. The data are presented in Table 1.

The results of the emulsion polymerization carried out without addition of sodium hydrogen carbonate are shown as control data in Table 1. The conventional emulsifiers shown in Table 1 were also subjected to the same determinations.

TABLE 1

| | Solids (%) | Amount of coagulated matter (%) | Mechanical stability (%) | Forming property (ml) | Reaction rate of emulsifier (%) | Water resistance (hr.) |
|---|---|---|---|---|---|---|
| Emulsifier | | | | | | |
| Emulsifier [A] | 41.1 | 0.12 | 0.65 | 2 | 100 | 300< |
| Emulsifier [B] | 41.9 | 0.09 | 0.37 | 0 | 100 | 300< |
| Emulsifier [C] | 41.2 | 0.18 | 0.74 | 1 | 100 | 300< |
| Emulsifier [D] | 41.5 | 0.09 | 0.46 | 0 | 99 | 300< |
| Emulsifier [E] | 41.9 | 0.06 | 0.36 | 0 | 100 | 300< |
| Emulsifier [F] (50%) Emulsifier [A] (50%) | 41.0 | 0.19 | 0.78 | 2 | 99 | 300< |
| Emulsifier [G] | 41.4 | 0.13 | 0.55 | 0 | 98 | 270 |
| Emulsifier [H] | 40.9 | 0.20 | 0.72 | 1 | 97 | 270 |
| Emulsifier [K] | 42.0 | 0.07 | 0.42 | 0 | 100 | 300< |
| Emulsifier [M] | 41.9 | 0.08 | 0.56 | 1 | 100 | 300< |
| Emulsifier [O] | 42.0 | 0.06 | 0.39 | 0 | 100 | 300< |
| Emulsifier [S] | 41.9 | 0.19 | 0.67 | 1 | 98 | 300< |
| Emulsifier [A] (50%) Emulsifier [B] (50%) | 42.0 | 0.05 | 0.38 | 0 | 100 | 300< |
| Comparative Example (control) | | | | | | |
| Emulsifier [A] (*a) | 16.8 | 19.75 | *1 | *1 | *1 | *1 |
| Emulsifier [K] (*a) | 21.8 | 25.33 | *1 | *1 | *1 | *1 |
| Octylphenol-EO (40M) adduct (50%) Octylphenol-EO (10M) adduct | 40.9 | 1.02 | 2.45 | 12 | *2 | 8 |

TABLE 1-continued

| | Solids (%) | Amount of coagulated matter (%) | Mechanical stability (%) | Forming property (ml) | Reaction rate of emulsifier (%) | Water resistance (hr.) |
|---|---|---|---|---|---|---|
| (50%) Sodium dodecylbenzenesulfonate | 41.0 | 1.56 | 2.89 | 26 | *2 | 3 |

(*a) The pH control agent (sodium hydrogencarbonate) was not used. Thus, the emulsion polymerization reaction was carried out without controlling the reaction system at pH ≧ 4.
*1 No satisfactory emulsion was obtained and, hence, no determination was made.
*2 Since the emulsifier used was a non-reactive type emulsifier, no determination was made.
(Solids): The emulsion, 2 g, was dried at 105° C. for 2 hours and weighed and this dry weight (nonvolatile matter) was expressed as % of the weight of the emulsion.
(Amount of coagulated matter): The emulsion was filtered through a 150-mesh metal sieve and the fraction on sieve was rinsed with water and dried. The weight of the coagulated matter thus obtained was expressed as % of the weight of the monomer charge.
(Mechanical Stability): The emulsion, 50 g, was stirred in a Marlon type tester under a load of 10 kg at 1000 rpm for 5 minutes and, then, filtered through a 150-mesh metal sieve. The fraction on sieve was washed with water, dried and weighed and this dry weight was expressed as % of the solids content of the emulsion.
(Foaming property): The emulsion was diluted 2-fold with deionized water and 30 ml of the dilution was put in a 100 ml Nestler tube. The tube was shaken for 1 minute and then allowed to sit for 5 minutes and the volume of the foam was determined.
(Reaction rate of emulsifier): Methanol was added to the emulsion to solidify the polymer and the mixture was centrifuged. Using the supernatant, the unreacted emulsifier was assay by HLPC and the reaction rate of the emulsifier was calculated.
(Water resistance test): A 0.5 mm thick polymer film was prepared on a glass sheet and immersed in water, and the time which had passed until 4.5-point characters became illegible through the film was determined.

*a: The pH control agent (sodium hydrogencarbonate) was not used. Thus, the emulsion polymerization reaction was carried out without controlling the reaction system at pH≧4.
*1- No satisfactory emulsion was obtained and, hence, no determination was made.
*2- Since the emulsifier used was a non-reactive type emulsifier, no determination was made.
(Solids): The emulsion, 2 g, was dried at 105° C. for 2 hours and weighed and this dry weight (nonvolatile matter) was expressed as % of the weight of the emulsion.
(Amount of coagulated matter): The emulsion was filtered through a 150-mesh metal sieve and the fraction on sieve was rinsed with water and dried. The weight of the coagulated matter thus obtained was expressed as % of the weight of the monomer charge.
(Mechanical Stability): The emulsion, 50 g, was stirred in a Marlon type tester under a load of 10 kg at 1000 rpm for 5 minutes and, then, filtered through a 150-mesh metal sieve. The fraction on sieve was washed with water, dried and weighed and this dry weight was expressed as % of the solids content of the emulsion.
(Foaming property): The emulsion was diluted 2-fold with deionized water and 30 ml of the dilution was put in a 100 ml Nestler tube. The tube was shaken for 1 minute and then allowed to sit for 5 minutes and the volume of the foam was determined.
(Reaction rate of emulsifier): Methanol was added to the emulsion to solidify the polymer and the mixture was centrifuged. Using the supernatant, the unreacted emulsifier was assay by HLPC and the reaction rate of the emulsifier was calculated.
(Water resistance test): A 0.5 mm thick polymer film was prepared on a glass sheet and immersed in water, and the time which had passed until 4.5-point characters became illegible through the film was determined.

Example of Use-2

Using Homo-Disper, a monomer emulsion was prepared by admixing 100 g of butyl acrylate, 100 g of styrene, 194 g of deionized water and 6 g of the decomposition type reactive emulsifier shown in Table 2. Then, a reactor equipped with a stirrer, reflux-condenser, thermometer, drip funnel and nitrogen gas inlet pipe was charged with 100 g of deionized water and 0.5 g of sodium hydrogencarbonate. After the temperature was increased to 80° C., nitrogen gas was bubbled into the water to remove dissolved oxygen. Then, a 80 g portion of said monomer emulsion was fed to the reactor with stirring and 0.5 g of ammonium persulfate was further added for preliminary polymerization. Over a time from 10 minutes to 3 hours following initiation of polymerization, the remaining 320 g portion of the monomer emulsion was added dropwise for polymerization. Thereafter, the reaction mixture was incubated for aging at the polymerization temperature of 80° C. for 2 hours. After cooling, the emulsion was taken out for use as a test sample.

The amount of coagulated matter in this emulsion polymerization stage, the solids content, mechanical stability and foaming property of the emulsion obtained, the reaction rate of the emulsifier used, and the water resistance of the polymer film obtained from the emulsion were respectively determined. The data are presented in Table 2.

The results of the emulsion polymerization reaction carried out without addition of sodium hydrogencarbonate are shown as control data in Table 2. The conventional emulsifiers shown in Table 2 were also subjected to the same determinations as above.

TABLE 2

| | Solids (%) | Amount of coagulated matter (%) | Mechanical stability (%) | Forming property (ml) | Reaction rate of emulsifier (%) | Water resistance (hr.) |
|---|---|---|---|---|---|---|
| Emulsifier | | | | | | |
| Emulsifier [A] | 41.0 | 0.19 | 0.40 | 0 | 100 | 300< |
| Emulsifier [E] | 41.5 | 0.12 | 0.45 | 0 | 100 | 300< |
| Emulsifier [I] | 41.7 | 0.14 | 0.55 | 1 | 99 | 270 |
| Emulsifier [J] | 42.0 | 0.08 | 0.50 | 2 | 100 | 300< |
| Emulsifier [K] | 42.0 | 0.06 | 0.45 | 0 | 100 | 300< |
| Emulsifier [L] | 42.0 | 0.08 | 0.56 | 0 | 100 | 300< |
| Emulsifier [M] | 41.8 | 0.10 | 0.66 | 0 | 99 | 300< |
| Emulsifier [N] | 41.9 | 0.15 | 0.53 | 0 | 100 | 300< |
| Emulsifier [O] | 41.7 | 0.12 | 0.49 | 1 | 99 | 300< |
| Emulsifier [P] | 41.6 | 0.17 | 0.63 | 1 | 97 | 300< |
| Emulsifier [Q] (50%) Emulsifier [A] (50%) | 41.0 | 0.18 | 0.60 | 1 | 98 | 270 |
| Emulsifier [R] (50%) Emulsifier [E] (50%) | 41.4 | 0.15 | 0.42 | 1 | 97 | 300< |
| Emulsifier [J] (50%) Emulsifier [A] (50%) | 41.8 | 0.06 | 0.51 | 1 | 100 | 300< |
| Comparative Example (control) | | | | | | |
| Emulsifier [J] (*a) | 12.9 | 21.96 | *1 | *1 | *1 | *1 |
| Emulsifier [N] (*a) | 19.3 | 32.84 | *1 | *1 | *1 | *1 |
| Nonylphenol-EO (10M) adduct sulfate ammonium salt | 41.6 | 0.56 | 2.02 | 15 | *2 | 5 |
| Sodium dodecylbenzenesulfonate | 41.0 | 0.79 | 2.67 | 23 | *2 | 3 |

(*a) The pH control agent (sodium hydrogencarbonate) was not used. Thus, the emulsion polymerization reaction was carried out without controlling the reaction system at pH ≧ 4.
*1 No satisfactory emulsion was obtained and, hence, no determination was made.
*2 Since the emulsifier used was a non-reactive type emulsifier, no determination was made.
(Solids): The emulsion, 2 g, was dried at 105° C. for 2 hours and weighed and this dry weight (nonvolatile matter) was expressed as % of the weight of the emulsion.
(Amount of coagulated matter): The emulsion was filtered through a 150-mesh metal sieve and the fraction on sieve was washed with water and dried. The weight of the coagulated matter thus obtained was expressed as % of the weight of the monomer charge.
(Mechanical Stability): The emulsion, 50 g, was stirred in a Marlon type tester under a load of 10 kg at 1000 rpm for 5 minutes and, then, filtered through a 150-mesh metal sieve. The fraction on sieve was washed with water, dried and weighed and this dry weight was expressed as % of the solids content of the emulsion.
(Foaming property): The emulsion was diluted 2-fold with deionized water and 30 ml of the dilution was put in a 100 ml Nestler tube. The tube was shaken for 1 minute and then allowed to sit for 5 minutes and the volume of the foam was determined.
(Reaction rate of emulsifier): Methanol was added to the emulsion to solidify the polymer and the mixture was centrifuged. Using the supernatant, the unreacted emulsifier was assayed by HLPC and the reaction rate of the emulsifier was calculated.
(Water resistance test): A 0.5 mm thick polymer film was prepared on a glass sheet and immersed in water, and the time which had passed until 4.5-point characters became illegible through the film was determined.

*a: The pH control agent (sodium hydrogencarbonate) was not used. Thus, the emulsion polymerization reaction was carried out without controlling the reaction system at pH≧4.
*1- No satisfactory emulsion was obtained and, hence, no determination was made.
*2- Since the emulsifier used was a non-reactive type emulsifier, no determination was made.
(Solids): The emulsion, 2 g, was dried at 105° C. for 2 hours and weighed and this dry weight (nonvolatile matter) was expressed as % of the weight of the emulsion.
(Amount of coagulated matter): The emulsion was filtered through a 150-mesh metal sieve and the fraction on sieve was washed with water and dried. The weight of the coagulated matter thus obtained was expressed as % of the weight of the monomer charge.
(Mechanical Stability): The emulsion, 50 g, was stirred in a Marlon type tester under a load of 10 kg at 1000 rpm for 5 minutes and, then, filtered through a 150-mesh metal sieve. The fraction on sieve was washed with water, dried and weighed and this dry weight was expressed as % of the solids content of the emulsion.
(Foaming property): The emulsion was diluted 2-fold with deionized water and 30 ml of the dilution was put in a 100 ml Nestler tube. The tube was shaken for 1 minute and then allowed to sit for 5 minutes and the volume of the foam was determined.
(Reaction rate of emulsifier): Methanol was added to the emulsion to solidify the polymer and the mixture was centrifuged. Using the supernatant, the unreacted emulsifier was assayed by HLPC and the reaction rate of the emulsifier was calculated.
(Water resistance test): A 0.5 mm thick polymer film was prepared on a glass sheet and immersed in water, and the time which had passed until 4.5-point characters became illegible through the film was determined.

Example of Use 3

A pressure-resistant glass reactor, i.e. an empty bottle for carbonated beverage use, was charged with 60 g of deionized water and the dissolved oxygen was removed by bubbling nitrogen gas through the water. The glass bottle was then cooled in an ice-water bath and further charged with 1.2 g of the decomposition type reactive emulsifier of this invention (Table 3), 0.12 g of naphthalenesulfonic acid-formaldehyde condensate, 0.12 g of dodecylmercaptan, 20 g of styrene, 0.03 g of p-menthane hydroperoxide, 0.02 g of ferrous sulfate $7H_2O$ and 0.01 g of sodium formaldehyde-sulfoxylate. Then, butadiene was fed from a butadiene bombe into a graduated sampling tube in a methanol-dry ice bath and 22 g of liquefied butadiene was added to the glass bottle using a syringe equipped with a stop cock. After a 2-gram portion of the butadiene was gasified to drive off the air, the bottle was immediately stoppered and shaken to emulsify the contents of the bottle.

Then, the glass bottle was set in the holder of a rotary polymerization device controlled at a water temperature of 5° C., the polymerization reaction was carried out for 5 hours under spinning at 50 rpm. After completion of the polymerization reaction, the glass bottle was opened and the polymerization was stopped by adding N,N-diethylhydroxylamine. The residual monomer was then distilled off under reduced pressure to provide a polymer latex for use as a test sample.

The amount of coagulated matter in this emulsion polymerization step, the solids content, mechanical stability and foaming property of the resulting latex, and the water absorption rate and resistance to thermal discoloration of the polymer film obtained were respectively determined. The test results are shown in Table 3.

When the polymer latex obtained as above was brought to pH 2 or less with 1% sulfuric acid, the latex was immediately destroyed to cause separation of the polymer. The temperature was then increased to 60° C. with constant stirring and the system was left standing to let the polymer float up. This polymer was recovered, washed with 3 portions of warm water, dehydrated and finally dried in vacuo at 60° C. The dry polymer recovery rate is shown in Table 31.

As controls, the conventional emulsifiers were tested in the same manner. The results are shown in Table 3.

TABLE 3

| | Solids (%) | Amount of coagulated matter (%) | Mechanical stability (%) | Foaming property (ml) | Water absorption (%) | Resistance to thermal discoloration | Polymer recovery rate (%) |
|---|---|---|---|---|---|---|---|
| Emulsifier | | | | | | | |
| Emulsifier [E] | 32.4 | 0.20 | 0.48 | 0 | 4.2 | ⊙ | 98.2 |
| Emulsifier [A] (50%) Emulsifier [L] (50%) | 32.6 | 0.18 | 0.68 | 1 | 6.4 | ⊙ | 99.2 |
| Emulsifier [E] (50%) Emulsifier [R] (50%) | 33.8 | 0.10 | 0.34 | 1 | 5.8 | ⊙ | 98.4 |
| Emulsifier [J] | 33.4 | 0.13 | 0.45 | 0 | 7.2 | ○ | 98.2 |
| Emulsifier [L] | 33.2 | 0.11 | 0.56 | 0 | 6.3 | ○ | 98.6 |
| Emulsifier [M] | 34.0 | 0.14 | 0.58 | 1 | 7.9 | ○ | 98.5 |
| Emulsifier [N] | 34.2 | 0.09 | 0.42 | 0 | 4.6 | ⊙ | 99.5 |
| Emulsifier [S] | 33.6 | 0.17 | 0.63 | 1 | 7.7 | ○ | 99.0 |
| Comparative Example (control) | | | | | | | |
| Disproportionated potassium rosinate | 32.2 | 0.18 | 1.23 | 9 | 17.8 | Δ | 96.4 |
| Dodecyl diphenyl ether disulfonate sodium | 33.4 | 0.14 | 2.54 | 20 | 28.9 | X | 93.9 |
| Reactive emulsifier [1] *1 | 31.7 | 0.93 | 0.96 | 14 | 18.1 | Δ | 94.8 |
| Reactive emulsifier [2] *2 | 32.3 | 0.64 | 2.99 | 21 | 33.5 | X | 93.7 |
| Decomposition type emulsifier *3 | 31.8 | 1.13 | 3.45 | 15 | 17.5 | Δ | 96.9 |

*1: Nonylphenol allyl glycidyl ether (1M)-ethylene oxide (20M) adduct
*2: The reactive emulsifier of the following chemical formula:

TABLE 3-continued

|  | Solids (%) | Amount of coagulated matter (%) | Mechanical stability (%) | Foaming property (%) | Water absorption (ml) | Resistance to thermal discoloration | Polymer recovery rate (%) |
| --- | --- | --- | --- | --- | --- | --- | --- |

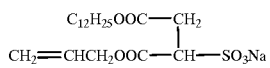

*3: The reactive emulsifier of the following chemical formula:

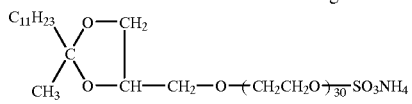

(Solids content): The latex, 2 g, was dried in vacuo at 105° C. for 1 hour and then weighed. The dry weight thus found was expressed as % of the weight of the latex taken.

(Amount of coagulated matter): The latex was sieved through a 150-mesh metal sieve and the fraction on sieve was washed with water and dried in vacuo. The weight of the dry coagulated matter was expressed as % of the weight of the monomer charge.

(Mechanical stability): The latex, 50 g, was stirred in a Marlon type tester using a load of 10 kg and a rotational speed of 1000 rpm for 5 minutes and, then, sieved through a 150-mesh metal sieve. The fraction on sieve was washed with water and dried in vacuo. The dry weight thus found was expressed as % of the dry weight of the emulsion.

(Forming property): The latex was diluted 2-fold with deionized water and a 30 ml portion of the diluted latex was taken in a 100 ml Nestler tube. The tube was turned upside down 30 times and allowed to sit for 5 minutes and the volume of the foam was determined.

(Water absorption rate): The 0.5 mm thick polymer film prepared on the surface of a glass sheet was gently peeled off and cut to 100 mm L×100 mm W. The testpiece thus prepared was immersed in water for 24 hours, then taken out and drained of water between two sheets of filter paper. The testpiece was then weighed and the gain in weight over the weight prior to immersion was expressed in %.

(Resistance to thermal discoloration): The 0.5 mm thick polymer film prepared on the surface of a glass sheet was heat-treated in a hot-air dryer controlled at 250° C. for 30 minutes to check for discoloration of the polymer film.

[Evaluation Criteria]

⊚: Not discolored at all

○: Slightly discolored

Δ: Discolored yellow

X: Discolored deep brown (Polymer recovery rate): The weight of the dried polymer was expressed as % of the theoretical dry weight calculated from the solid contents of the latex.

Example of Use-4

An autoclave equipped with a stirrer, thermometer and reflux-condenser was charged with 500 g of deionized water, 25 g of the decomposition type reactive emulsifier of this invention (Table 4), 2.5 g of naphthalenesulfonic acid-formaldehyde condensate, 2.5 g of sodium carbonate and 2.5 g of dodecylmercaptan. Then, 1.5 g of potassium persulfate was further added and the internal atmosphere of the autoclave was replaced with nitrogen gas. After this nitrogen gas purging, cooling water at 5° C. was introduced into the autoclave for cooling the contents, and 500 g of butadiene was supplied from a cylinder to the autoclave and the stirrer was driven at a high speed to prepare an emulsion. The internal temperature was then increased to 60° C. and the polymerization reaction was carried out for 35 hours. After completion of polymerization, the reaction mixture was cooled and the unreacted butadiene was distilled off under reduced pressure to provide a polybutadiene latex. The amount of coagulated matter in this emulsion polymerization step and the solids content and average particle diameter of the product polymer latex are shown in Table 4.

Then, a reactor equipped with a stirrer, reflux-condenser, thermometer, drip funnel and nitrogen gas inlet pipe was charged with 320 g, on a nonvolatile matter basis, of the polybutadiene latex prepared above and 180 g of deionized water (the amount of which should be fine-adjusted according to the solids content of the polymer latex). Separately, 225 g of styrene, 95 g of acrylonitrile, 300 g of deionized water and 9.6 g of the same decomposition type reactive emulsifier as used in the preparation of the polybutadiene latex was dispersed together in Homo-Disper to prepare a monomer emulsion. A 65 g portion of this monomer emulsion was added, under constant stirring, to the above reactor followed by nitrogen gas purging. The reactor was then cooled and when the internal temperature had reached 10° C., 1.2 g of p-menthane hydroperoxide, 0.6 g of ferrous sulfate 7H$_2$O and 0.3 g of sodium formaldehyde-sulfoxylate were added for preliminary polymerization. Then, over a time from 15 minutes to 3 hours following initiation of polymerization, the remaining portion of the monomer emulsion was added dropwise for polymerization. The reaction mixture was further maintained for aging at the polymerization temperature for 2 hours and, then, N,N-diethylhydroxylamine was added so as to stop the reaction. Thereafter, nitrogen gas was introduced and the residual monomer was distilled off under reduced pressure. The resulting polymer latex was used as a test sample.

The amount of coagulated matter in this emulsion polymerization step, the solids content and average particle diameter of the resulting polymer latex, and the reaction rate of the emulsifier used were determined. The results are shown in Table 5.

A 250 g portion of the polymer latex obtained above was adjusted to pH 2 or less with 1% sulfuric acid, whereupon the latex was destroyed and the polymer separated out immediately. Then, the system was heated to 60° C. with constant stirring and then allowed to stand, whereupon the polymer floated up. This polymer was recovered, washed with 3 portions of warm water, dehydrated and dried. The polymer recovery rate in this step, the total amount of organic carbon (TOC) in a concentrate of the total waste water recovered in the polymer recovery step, and the degree of residence discoloration in the molding step were determined. The results are shown in Table 5.

As controls, the conventional emulsifiers were also subjected to the same tests. The results are shown in Tables 4 and 5.

TABLE 4

| | Results of emulsion polymerization of butadiene | | |
|---|---|---|---|
| | Solids (%) | Amount of coagulated matter (%) | Average particle diameter ($\mu$m) |
| Emulsifier | | | |
| Emulsifier [E] | 40.5 | 0.14 | 0.187 |
| Emulsifier [A] (50%) Emulsifier [L] (50%) | 40.6 | 0.15 | 0.145 |
| Emulsifier [J] | 41.2 | 0.09 | 0.132 |
| Emulsifier [L] | 41.1 | 0.11 | 0.128 |
| Emulsifier [M] | 40.9 | 0.09 | 0.139 |
| Emulsifier [N] | 41.1 | 0.07 | 0.140 |
| Emulsifier [O] | 40.6 | 0.13 | 0.145 |
| Comparative Example (control) | | | |
| Dispropotionated potassium rosinate | 40.6 | 0.06 | 0.161 |
| Potassium oleate | 36.9 | 0.98 | 0.123 |
| Reactive emulsifier [1]*1 | 40.1 | 0.82 | 0.138 |
| Reactive emulsifier [2]*2 | 37.5 | 1.10 | 0.109 |
| Decomposition type emulsifier*3 | 37.2 | 1.38 | 0.148 |

TABLE 4-continued

| | Results of emulsion polymerization of butadiene | | |
|---|---|---|---|
| | Solids (%) | Amount of coagulated matter (%) | Average particle diameter ($\mu$m) |

*1 and *2 denote the same reactive emulsifiers as used for control in Example of Use-3.
*3 denote the same decomposition type emulsifier as used for control in Example of Use-3.
(Solids): The latex, 2 g, was dried in vacuo at 105° C. for 1 hour and then weighed. This dry weight was expressed as % of the weight of the latex sample.
(Amount of coagulated matter): The latex was sieved through a 150-mesh metal sieve and the fraction on sieve was washed with water and dried in vacuo. The dry weight thus found was expressed as % of the weight of the monomer charge.
(Average particle diameter): The average particle diameter of the latex was measured with Shimadzu laser defraction type particle size distribution analyzer SALD-2000.

*1 and *2 denote the same reactive emulsifiers as used for control in Example of Use-3.

*3 denote the same decomposition type emulsifier as used for control in Example of Use-3.

(Solids): The latex, 2 g, was dried in vacuo at 105° C. for 1 hour and then weighed. This dry weight was expressed as % of the weight of the latex sample.

(Amount of coagulated matter): The latex was sieved through a 150-mesh metal sieve and the fraction on sieve was washed with water and dried in vacuo. The dry weight thus found was expressed as % of the weight of the monomer charge.

(Average particle diameter): The average particle diameter of the latex was measured with Shimadzu laser detraction type particle size distribution analyzer SALD-2000.

TABLE 5

| | Results of emulsion polymerization of butadiene-styrene-acrylonitrile | | | | | | |
|---|---|---|---|---|---|---|---|
| | Solids (%) | Amount of coagulated matter (%) | Average particle diameter ($\mu$m) | Reaction rate of emulsifier (%) | Polymer recovery rate (%) | TOC (ppm) | Residence discoloration |
| Emulsifier | | | | | | | |
| Emulsifier [E] | 39.0 | 0.18 | 0.362 | 99 | 98.1 | 1690 | ⊚ |
| [A] (50%)/ [L] (50%) | 40.2 | 0.10 | 0.340 | 100 | 99.2 | 3860 | ⊚ |
| Emulsifier [J] | 40.5 | 0.11 | 0.290 | 100 | 98.8 | 4130 | ○ |
| Emulsifier [L] | 40.2 | 0.12 | 0.305 | 100 | 98.6 | 4250 | ○ |
| Emulsifier [M] | 39.2 | 0.10 | 0.293 | 98 | 98.0 | 3750 | ○ |
| Emulsifier [N] | 39.2 | 0.08 | 0.320 | 100 | 99.6 | 3210 | ⊚ |
| Emulsifier [O] | 38.6 | 0.09 | 0.356 | 99 | 99.2 | 2350 | ⊚ |
| Comparative Example (control) | | | | | | | |
| Disproportionated potassium rosinate | 38.7 | 0.13 | 0.284 | *4 | 96.8 | 9180 | x |
| Potassium oleate | 36.2 | 0.87 | 0.228 | *4 | 96.1 | 10020 | x |
| Reactive emulsifier [1]*1 | 38.0 | 0.88 | 0.292 | 73 | 93.2 | 18530 | x |
| Reactive emulsifier [2]*2 | 39.5 | 0.48 | 0.157 | 62 | 91.5 | 25630 | x |

TABLE 5-continued

Results of emulsion polymerization of butadiene-styrene-acrylonitrile

|  | Solids (%) | Amount of coagulated matter (%) | Average particle diameter (μm) | Reaction rate of emulsifier (%) | Polymer recovery rate (%) | TOC (ppm) | Residence discoloration |
|---|---|---|---|---|---|---|---|
| Reactive emulsifier [3]*3 | 36.9 | 0.87 | 0.265 | *4 | 96.5 | 6320 | Δ |

[A] (50)/[L] 50% = Emulsifier [A] of the invention (50%) + emulsifier [L] of the invention (50%)
*1 and *2 denote the same reactive emulsifiers as used for control in Example of Use-3.
*3 denotes the same decomposition type emulsifier as used for control in Example of Use-3.
*4 denotes a non-reactive type emulsifier and, therefore, no determination was made.
(Solids): The latex, 2 g, was dried in vacuo at 105° C. for 2 hour and then weighed. This dry weight was expressed as % of the weight of the latex sample.
(Amount of coagulated matter): The latex was sieved through a 150-mesh metal sieve and the fraction on sieve was washed with water and dried in vacuo. The dry weight thus found was expressed as % of the weight of the monomer charge.
(Average particle diameter): The average particle diameter of the latex was measured with Shimadzu laser defraction type particle size distribution analyzer SALD-2000.
(Reaction rate of emulsifier): The latex was coagulated by adding methanol and centrifuged. Using the supernatant, the unreacted emulsifier was assayed by HPLC and the reaction rate of the emulsifier was calculated.
(Polymer recovery rate): The dry weight of the polymer was expressed as % of the theoretical dry weight calculated from the solids content of the latex.
(Total organic carbon [TOC]): The whole amount of effluent water (inclusive of the water used for washing the polymer) in the polymer recovery step was recovered and concentrated to 250 ml. A portion of the concentrate was sampled and the total organic carbon (TOC) was determined with Shimadzu TOC-500.
(Residence discoloration): The dry polymer obtained was molded at a molding temperature of 250° C. and a metal die temperature of 50° C. to prepare a reference testpiece measuring 125 mm L × 125 mm W × 3.5 mm T. A testpiece was also prepared in the same manner except that the polymer was allowed to reside in the molding machine at 250° C. for 20 minutes, and this testpiece was compared with the reference testpiece for the degree of discoloration.

*1 and *2 denote the same reactive emulsifiers as used for control in Example of Use-3.

*3 denotes the same decomposition type emulsifier as used for control in Example of Use-3.

*4 denotes a non-reactive type emulsifier and, therefore, no determination was made.

(Solids): The latex, 2 g, was dried in vacuo at 105° C. for 2 hour and then weighed. This dry weight was expressed as % of the weight of the latex sample.

(Amount of coagulated matter): The latex was sieved through a 150-mesh metal sieve and the fraction on sieve was washed with water and dried in vacuo. The dry weight thus found was expressed as % of the weight of the monomer charge.

(Average particle diameter): The average particle diameter of the latex was measured with Shimadzu laser detraction type particle size distribution analyzer SALD-2000.

(Reaction rate of emulsifier): The latex was coagulated by adding methanol and centrifuged. Using the supernatant, the unreacted emulsifier was assayed by HPLC and the reaction rate of the emulsifier was calculated.

(Polymer recovery rate): The dry weight of the polymer was expressed as % of the theoretical dry weight calculated from the solids content of the latex.

(Total organic carbon [TOC]): The whole amount of effluent water (inclusive of the water used for washing the polymer) in the polymer recovery step was recovered and concentrated to 250 ml. A portion of the concentrate was sampled and the total organic carbon (TOC) was determined with Shimadzu TOC-500.

(Residence discoloration): The dry polymer obtained was molded at a molding temperature of 250° C. and a metal die temperature of 50° C. to prepare a reference testpiece measuring 125 mm L×125 mm W×3.5 mm T. A testpiece was also prepared in the same manner except that the polymer was allowed to reside in the molding machine at 250° C. for 20 minutes, and this testpiece was compared with the reference testpiece for the degree of discoloration.

[Evaluation Criteria]

⊚: Not discolored at all

○: Slightly discolored

Δ: Discolored yellow

X: Discolored deep brown

Example of Use-5

The procedure of Example of Use-3 was followed to prepare a polybutadiene latex and, then, emulsion-polymerize styrene and acrylonitrile in said polybutadiene latex to provide a polymer latex, provided, however, that the level of addition of the decomposition type reactive emulsifier for emulsion polymerization was changed to 32 g. From this polymer latex, the polymer was recovered and dried. This polymer was molded at a molding temperature of 250° C. and a metal die temperature of 50° C. to prepare a testpiece measuring 125 mm L×125 mm W×3.5 mm T and the angle of contact and surface resistivity of the testpiece were determined. The test results are shown in Table 6.

As controls, the same tests were carried out using the conventional emulsifiers and the results are shown in Table 6.

(Angle of contact): The dried polymer was molded at a molding temperature of 250° C. and a metal die temperature of 50° C. to prepare a testpiece measuring 125 mm L×125 mm W×3.5 mm T. Using a contact angle tester, the water-drop contact angle of the testpiece was measured.

(Surface resistivity): The dried polymer was molded at a molding temperature of 250° C. and a metal die temperature of 50° C. The testpiece thus prepared was allowed to sit at 20° C. and 45% R.H. for 24 hours and its surface resistivity was measured.

TABLE 6

| | Angle of contact (°) | Surface resistivity (Ω) |
|---|---|---|
| Emulsifier | | |
| Emulsifier [B] | 45 | $4.0 \times 10^{11}$ |
| Emulsifier [E] | 44 | $5.1 \times 10^{11}$ |
| Emulsifier [J] | 32 | $2.7 \times 10^{11}$ |
| Emulsifier [L] | 42 | $3.0 \times 10^{11}$ |
| Emulsifier [N] | 43 | $3.4 \times 10^{11}$ |
| Emulsifier [Q] (50%) Emulsifier [E] (50%) | 33 | $3.1 \times 10^{11}$ |
| Emulsifier [S] | 20 | $1.8 \times 10^{11}$ |
| Comparative Example (control) | | |
| Dispropotionated potassium rosinate | 69 | $8.4 \times 10^{13}$ |
| Reactive emulsifier [1]*1 | 60 | $8.9 \times 10^{12}$ |
| Reactive emulsifier [2]*2 | 62 | $7.7 \times 10^{12}$ |
| Decomposition type emulsifier*3 | 85 | $9.8 \times 10^{13}$ |

*1 and *2 denote the same reactive emulsifier as used for control in Example of Use-3.
*3 denotes the same decomposition type reactive emulsifier as used for control in Example of Use-3.

What is claimed is:

1. A decomposition reactive emulsifier of the following formula (I):

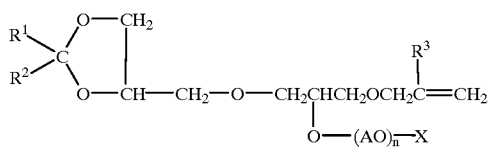

(I)

wherein $R^1$ and $R^2$ are the same or different and each is an alkyl or alkenyl group of 1 to 20 carbon atoms or a hydrogen atom and both $R^1$ and $R^2$ are not concurrently a hydrogen atom;

$R^3$ is a hydrogen atom or a methyl group;

A is an alkylene or substituted alkylene group of 2 to 4 carbon atoms;

n is an integer of from 1 to 100 where X is a hydrogen atom or n is an integer of from 0 to 100 where X is an ionic hydrophilic group, said ionic hydrophilic group being anionic, cationic or amphoteric and when n is 2 or greater $(AO)_n$ is a homopolymer comprising a single repeating unit of formula (i) or a block or random polymer comprising two or more different substituent groups $(A^1, A^2, \ldots)$ of formula (ii), $$-(AO)-(AO)-(AO)- \qquad (i),$$

$$-(A^1O)_{n1}-(A^2O)_{n2}- \qquad (ii),$$

wherein $n_1+n_2+\ldots =n$.

2. A decomposition reactive emulsifier of the following formula (I):

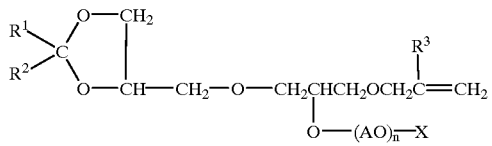

(I)

wherein $R^1$ and $R^2$ are the same or different and each is an alkyl or alkenyl group of 1 to 20 carbon atoms or a hydrogen atom and both $R^1$ and $R^2$ are not concurrently a hydrogen;

$R^3$ is a hydrogen atom or a methyl group;

X is a hydrogen atom;

A is an alkylene or substituted alkylene group of 2 to 4 carbon atoms;

n is an integer of from 5 to 93 and when n is 2 or greater $(AO)_n$ is a homopolymer comprising a single repeating unit of formula (i) or a block or random polymer comprising two or more different substituent groups $(A^1, A^2, \ldots)$ of formula (ii), $$-(AO)-(AO)-(AO)- \qquad (i),$$

$$-(A^1O)_{n1}-(A^2O)_{n2}- \qquad (ii),$$

wherein $n_1+n_2+\ldots =n$.

3. A decomposition reactive emulsifier of the following formula (I):

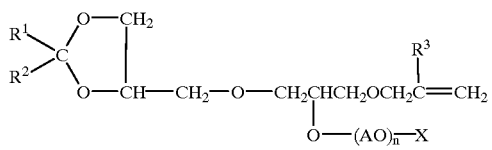

(I)

wherein $R^1$ and $R^2$ are the same or different and each is an alkyl or alkenyl group of 1 to 20 carbon atoms or a hydrogen atom and both $R^1$ and $R^2$ are not concurrently a hydrogen atom;

$R^3$ is a hydrogen atom or a methyl group;

A is an alkylene or substituted alkylene group of 2 to 4 carbon atoms;

n is an integer of from 0 to 100 and X is $-SO_3M^2$ wherein $M^2$ is a hydrogen atom, an alkali metal, an alkaline earth metal, ammonium or an alkanoamine residue, and when n is 2 or greater $(AO)_n$ is a homopolymer comprising a single repeating unit of formula (i) or a block or random polymer comprising two or more different substituent groups $(A^1, A^2, \ldots)$ of formula (ii), $$-(AO)-(AO)-(AO)- \qquad (i),$$

$$-(A^1O)_{n1}-(A^2O)_{n2}- \qquad (ii),$$

wherein $n_1+n_2+\ldots =n$.

4. A decomposition reactive emulsifier of the following formula (I):

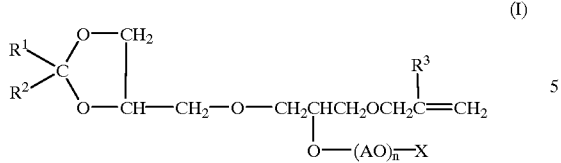 (I)

wherein $R^1$ and $R^2$ are the same or different and each is an alkyl or alkenyl group of 1 to 20 carbon atoms or a hydrogen atom and both $R^1$ and $R^2$ are not concurrently a hydrogen atom;

$R^3$ is a hydrogen atom or a methyl group;

A is an alkylene or substituted alkylene group of 2 to 4 carbon atoms;

n is an integer of from 1 to 100 and X is $-SO_3M^2$ wherein $M^2$ is a hydrogen atom, an alkali metal, an alkaline earth metal, ammonium or an alkanoamine residue, and when n is 2 or greater $(AO)_n$ is a homopolymer comprising a single repeating unit of formula (i) or a block or random polymer comprising two or more different substituent groups $(A^1, A^2, \ldots)$ of formula (ii), $$-(AO)-(AO)-(AO)- \qquad (i),$$

$$-(A^1O)_{n1}-(A^2O)_{n2}- \qquad (ii),$$

wherein $n_1+n_2+\ldots =n$.

* * * * *